Oct. 16, 1956  G. A. KREMER  2,766,607
VEHICLE LOCK ASSEMBLY
Filed June 16, 1954  3 Sheets-Sheet 1
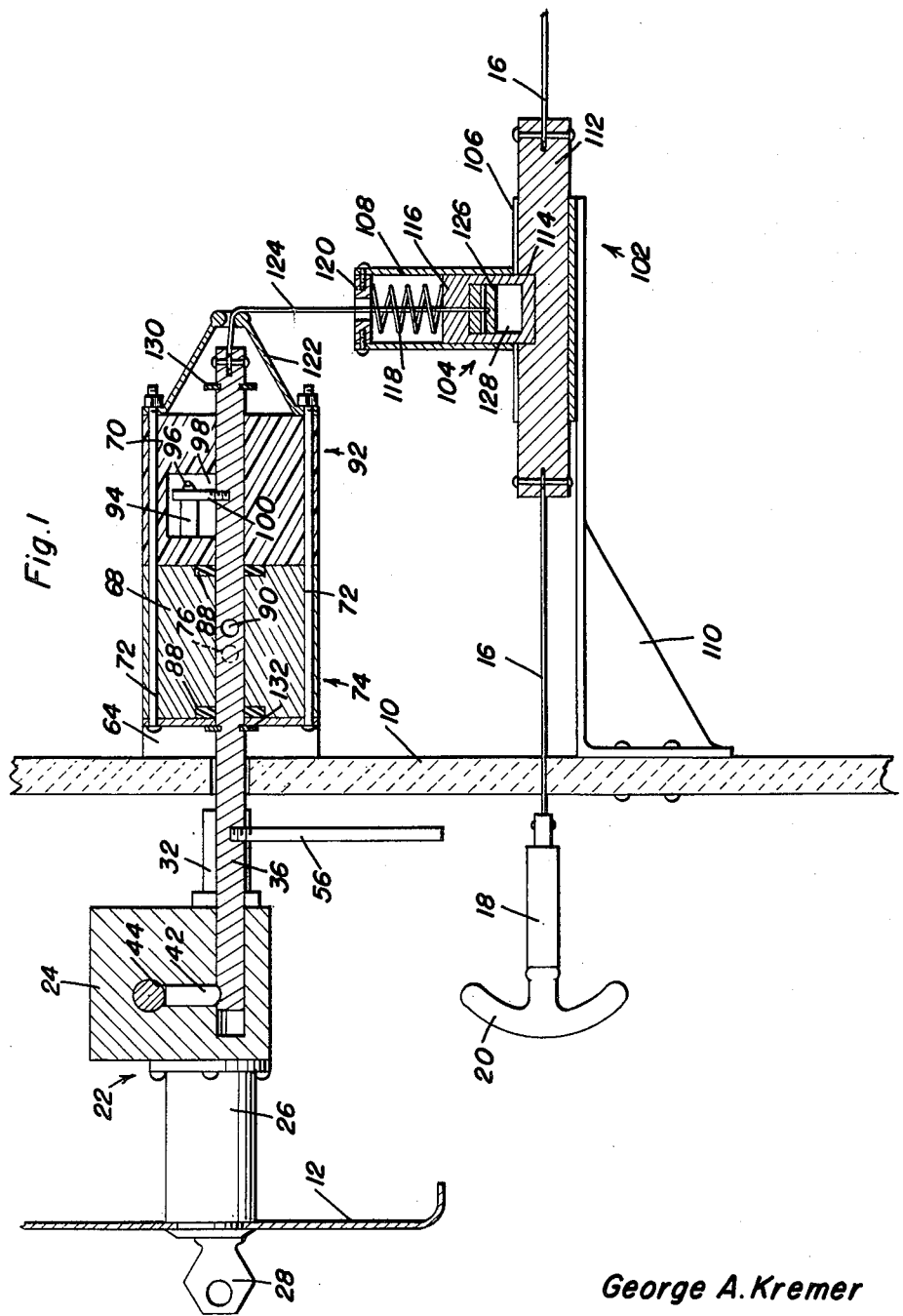
George A. Kremer
INVENTOR.
BY Clarence A. O'Brien
and Harvey B. Jackson
Attorneys

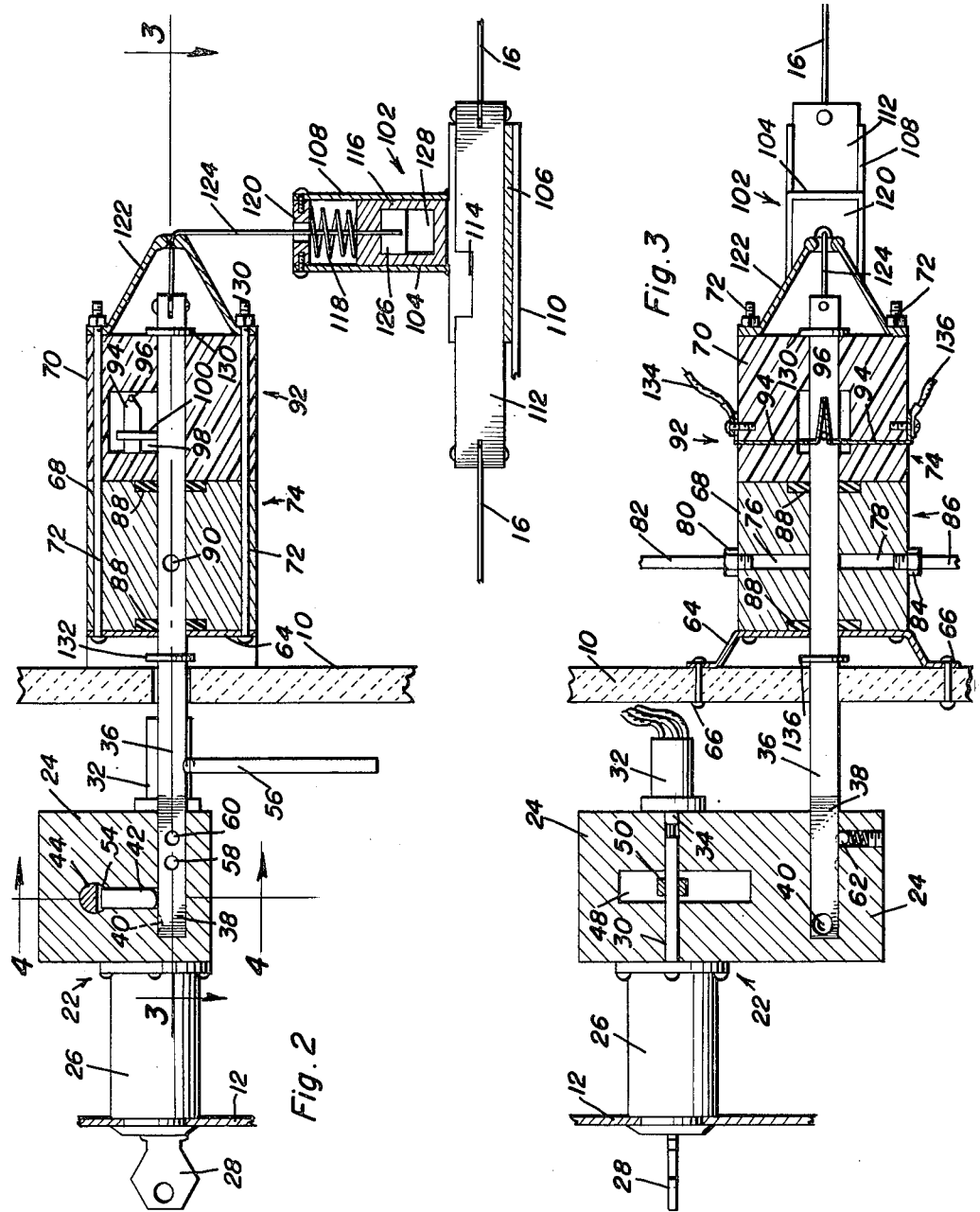

Oct. 16, 1956 G. A. KREMER 2,766,607
VEHICLE LOCK ASSEMBLY
Filed June 16, 1954 3 Sheets-Sheet 3

George A. Kremer
INVENTOR.

United States Patent Office 2,766,607
Patented Oct. 16, 1956

2,766,607

VEHICLE LOCK ASSEMBLY

George A. Kremer, Rochester, Pa., assignor of fifty percent to Carolyn M. Kremer, Rochester, Pa.

Application June 16, 1954, Serial No. 437,103

9 Claims. (Cl. 70—239)

This invention relates in general to lock assemblies, and more particularly, to an improved lock assembly for vehicles.

The average automobile is so constructed whereby once it has been entered, through the manipulation of wires either under the instrument panel thereof or under the hood, the engine thereof may be made to run so that the vehicle may be easily stolen. Inasmuch as the ventilator windows of a vehicle may be easily forced open, it will be seen that it is almost impossible to lock a modern day vehicle against theft.

It is therefore the primary object of this invention to provide an effective vehicle lock assembly which is of such a nature whereby a vehicle may be operated only through either the manipulation of a key operated lock thereof or through the breaking of such key operated lock.

Another object of this invention is to provide a vehicle lock assembly with the major portion thereof being mounted under the hood of such vehicle, the actuation of the hood being controlled by the vehicle lock assembly whereby access to the various parts of the lock assembly is not attainable to one not possessing a key to the vehicle.

Another object of this invention is to provide an improved vehicle lock assembly which includes an electrical switch for the vehicle mounted within the interior of the body thereof, the electrical switch having connected thereto an ignition wire which has mounted therein an ignition switch, the ignition switch being mounted under the hood of the vehicle so that it may not be readily accessible, thereby preventing the starting of the engine of the vehicle without the consent of the owner.

Another object of this invention is to provide an improved vehicle lock assembly which includes a fuel line lock whereby fuel to an engine of the vehicle may be shut off as desired.

A further object of this invention is to provide an improved vehicle lock assembly which includes ignition and fuel control assemblies mounted under the hood of the vehicle, the vehicle being also provided with a hood control cable latch whereby access to the ignition and fuel locks cannot be attained without first opening a latch controlling the operation of the hood control latch and the fuel and ignition controls.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary vertical sectional view taken through the interior of a vehicle and shows the relationship of the vehicle lock assembly, which is the subject of this invention, with respect to an instrument panel and a fire wall of such vehicle, portions of the vehicle lock assembly also being shown in section in order to clearly illustrate the details thereof, the vehicle lock assembly being illustrated in a locked position;

Figure 2 is a fragmentary vertical sectional view similar to Figure 1 and shows the vehicle lock assembly being in an inoperative position, the vertical sectional view being taken through a main portion only of the vehicle lock assembly;

Figure 3 is a fragmentary horizontal sectional view taken substantially upon the plane indicated by the section line 3—3 of Figure 2 and shows further the details of the vehicle lock assembly;

Figure 4:
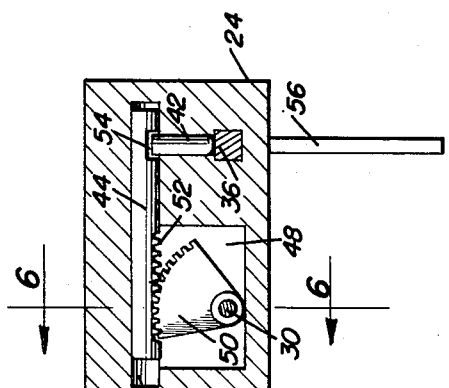
Figure 4 is a fragmentary vertical sectional view taken substantially upon the plane indicated by the section line 4—4 of Figure 2 and shows the details of means for releasing an operator of the lock assembly.

Referring now to the drawings in detail, it will be seen that there is illustrated in Figures 1, 2 and 3 a fire wall 10 of a conventional vehicle. Disposed rearwardly of the fire wall 10 is a depending portion of an instrument panel 12. It is to be understood that the fire wall 10 and the instrument panel 12 have the conventional relationship as that of a conventional vehicle, and that disposed forwardly of the fire wall 10 is a space covered by a hood (not shown) which prevents access to the interior of the engine compartment of which the fire wall 10 forms a rear wall.

In order that the hood may have the opening thereof controlled, there is provided a hood control cable 16 which extends through the fire wall 10 into the main portion of the vehicle body. The hood control cable 16 passes through a housing 18 which is suitably carried by the vehicle body and which has disposed in abutting engagement therewith a hood operator 20. The hood operator 20 is connected to the rear end of the hood control cable 16 by tensioning the same to unlock the hood.

Mounted in the space between the fire wall 10 and the instrument panel 12 is a key operated lock assembly which is referred to in general by the reference numeral 22. The key operated lock assembly 22 includes a generally rectangular housing 24 which has secured to the forward face thereof a tumbler barrel 26. The tumbler barrel 26 is, in turn, connected to the forward face of the instrument panel 12 to support the housing 24. Mounted within the tumbler housing 26 is a conventional tumbler assembly (not shown) in which is received a key 28 for operating the key operated lock 22.

Extending longitudinally through the housing 24 is a lock shaft 30 which is connected to the tumbler assembly for rotation therewith in response to rotation of the key 28 when inserted in the tumbler assembly. The housing 24 has mounted on the forward face thereof in alignment with the lock shaft 30 an electrical switch 32 for controlling various circuits of the vehicle of which the vehicle lock assembly is a part. The switch 32 includes a shaft 34 which is suitably connected to the forward end of the lock shaft 30 for actuation thereby.

Figure 5:
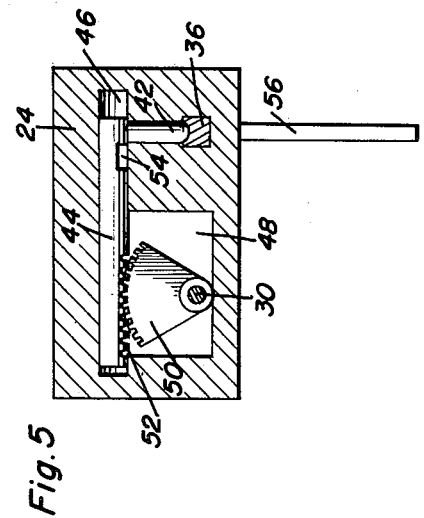
Figure 5 is a fragmentary vertical sectional view similar to Figure 4 and shows the operator in a locked position.
Figure 6:
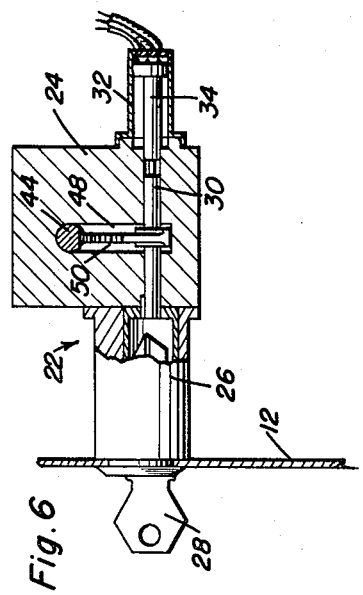
Figure 6 is a fragmentary vertical sectional view taken substantially upon the plane indicated by the section line 6—6 of Figure 4 and shows the details of the key operated lock.

Extending longitudinally through the housing 24 in spaced parallel relation to the lock shaft 30 is an operator 36. The operator 36 is provided with a flat rear portion 38 which, in turn, is provided with an upwardly facing recess 40 in the upper surface thereof. Normally seated within the recess 40 is the lower end of a vertical detent 42 which is mounted for vertical movement only, as is best illustrated in Figure 5. The detent 42 is normally retained in a lower position for locking the operator 36 by a transversely extending control shaft 44 which is slidably mounted in a transverse bore 46 in the housing 24. The end of the control rod 44 remote from the detent 42 is disposed in overlying relation to a transverse opening 48 in the housing 24 in which is mounted a sector gear 50 carried by the lock shaft 30 for rotation therewith. The sector gear 50 is engaged with a rack 52 on the control rod 44 for shifting the control rod 44 through the bore 46.

In order that the operator 36 may be released, the lower surface of the control rod 44 is provided with a recess 54. The recess 54 is selectively movable into alignment with the detent 42 so that the detent 42 may be forced up into the recess 54 to release the operator 36. When the recess 54 is aligned with the detent 42, the operator 36 may be moved rearwardly through the use of a depending handle 56 which is carried by the operator 36 forwardly of the housing 24 and rearwardly of the fire wall 10. In order that the operator 36 may be selectively positioned in operative and inoperative positions, there is formed in a side surface of the reduced portion 38 a pair of longitudinally spaced recesses 58 and 60. Carried by the housing 24 is a spring urged ball 62 for selective engagement within the recesses 58 and 60 to retain the operator 36 in an adjusted position.

Carried by the forward surface of the fire wall 10 in alignment with the longitudinal axis of the operator 36 is a mounting bracket 64. The mounting bracket 64 is secured in place on the fire wall 10 by suitable fasteners 66. Secured to the forward surface of the mounting bracket 64 in spaced relation with respect to the fire wall 10 is a valve housing 68. Also connected to the mounting bracket 64 is an insulated block 70 which is spaced from the mounting bracket 64 by the valve housing 68. The block 70 and the valve housing 68 are secured to the mounting bracket 64 by elongated fasteners 72 extending therethrough.

The valve housing 68 is a part of a fuel shut-off valve which is referred to in general by the reference numeral 74. The fuel shut-off valve 74 includes a transversely extending inlet passage 76 whose axis is disposed normal to the axis of the operator 36. An outlet passage 78 is also formed in the valve housing 68 in alignment with the inlet passage 76. Connected to the inlet passage 76 by a fitting 80 is a fuel line 82 which runs to the gas tank of the vehicle, the gas tank not being shown. Connected to the outlet passage 78 by a fitting 84 is a fuel line 86 which is connected to the engine (not shown) of the vehicle.

Extending through the center of the valve housing 68 is a forward portion of the operator 36. The operator 36 is sealed with respect to the valve housing 68 by a pair of sealing rings 88. Disposed transversely through the forward portion of the operator 36 is a fuel passage 90 which is best illustrated in Figure 2. The fuel passage 90 is selectively alignable with the fuel passages 76 and 78 to permit the flow of fuel therebetween, whereby fuel may be supplied to the engine of the vehicle.

Figures 7, 8:
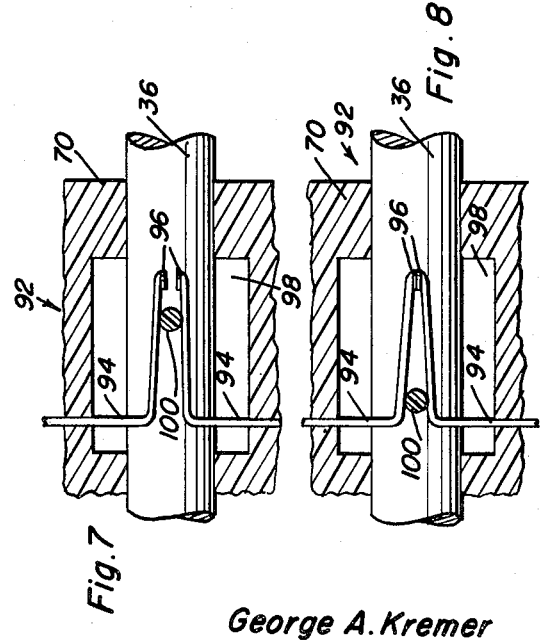
Figure 7 is an enlarged fragmentary horizontal sectional view taken through an ignition switch of the vehicle lock assembly and shows the ignition switch in an open position.
Figure 8 is an enlarged horizontal sectional view similar to Figure 7 and shows the ignition switch in a closed position.

The insulated block 70 forms a part of an ignition switch which is referred to in general by the reference numeral 92. The ignition switch 92 is formed by a pair of springs 94 which have mounted thereon contacts 96, as is best illustrated in Figure 7. The contacts 96 together with portions of the springs 94 are disposed in an enlarged opening 98 formed in the center of the insulated block 70. The springs 94 are so arranged as to normally urge the contacts 96 into abutting engagement, as is best illustrated in Figure 8.

The springs 94 are disposed above the operator 36, as is best illustrated in Figure 2, within the enlarged opening 98. Extending upwardly from the operator 36 is an insulated pin 100. The pin 100 is movable between adjacent portions of the springs 94 to urge the contacts 96 apart, as is best illustrated in Figure 7.

The vehicle lock assembly also includes a hood control cable latch which is referred to in general by the reference numeral 102. The latch 102 includes a generally T-shaped housing which is referred to in general by the reference numeral 104. The T-shaped housing 104 includes a lower horizontal leg 106 and a vertical leg 108. The horizontal leg 106 is secured to a mounting bracket 110 which is, in turn, fastened to the fire wall 10, as is best illustrated in Figure 1.

Slidably mounted within the horizontal leg 106 is a block 112 which has connected thereto opposite ends of the hood control cable 16. The block 112 is provided intermediate its ends in its upper surface with a recess 114. Carried by the vertical leg 108 is a detent 116 seatable within the recess 114 to lock the block 112 against movement. The detent 116 is spring urged downwardly into the recess 114 by a spring 118 mounted in the upper portion of the leg 108. The spring 118 and the detent 116 are retained within the vertical leg 108 by a removable cover plate 120.

As is best illustrated in Figure 2, the forward end of the insulated block 70 has secured thereagainst by the fasteners 72 a generally conical cover 122. The cover 122 has extending therethrough a cable 124 which is a continuation of the operator 36 and forms a forward extension of the rod which actually forms the rear portion of the operator 36. The cable 124 passes through the cover 120 into the upper leg 108 and passes downwardly into the detent 116 where it is secured to a stop block 126 mounted within an opening 128 in the detent 116. The connection between the block 126 and the detent 116 is in the form of a lost motion connection inasmuch as the detent 116 need not be moved as far as the other parts of the vehicle lock assembly in order to be moved to a released position. Further, this permits the flight out of adjustment of the length of the operator 36.

When the vehicle lock assembly is in a locked position, the detent 116 is seated in the recess 114 so as to lock the hood control cable 16 against movement whereby the hood of the vehicle is locked, and access to the interior of the engine compartment is prevented. Inasmuch as the fuel line shut-off valve 74, the ignition switch 92 and the hood control cable latch 102 are mounted within the engine compartment, it will be seen that access thereto is normally prevented.

When the vehicle lock assembly is in its locked position, the contacts 96 are separated, as is best illustrated in Figure 7, so that no electrical energy is supplied to the ignition system of the vehicle engine. Also, the fuel passage 90 in the operator 36 is disposed out of alignment with the fuel passages 76 and 78, as is best illustrated in Figure 1, so as to prevent the flow of fuel to the vehicle engine.

The operator 36 controls the operation of the fuel line shut-off valve 74, the ignition switch 92 and the hood control cable latch 102. However, it is locked against manual manipulation by the key operated lock 22 through the use of the detent 42. Thus, it will be seen that without a key, such as the key 28, the operator 36 may be locked against movement.

When it is desired to utilize a vehicle provided with the vehicle lock assembly which is the subject of this invention, it is necessary to place the key 28 in the tumbler assembly of the key operated lock 22. The key 28 is then turned to rotate the lock shaft 30 and to release the detent 42. Then, the operator 36 is moved rearwardly by pulling upon the handle 56. Rearward movement of the operator 36 is limited by a stop collar 130 carried by the operator 36 within the cone 122 for engagement with the forward surface of the insulated block 70 to limit rearward movement of the operator 36. A similar stop collar 132 is carried by the operator 36 for engagement with the rear surface of the mounting bracket 64 to limit forward movement of the operator 36.

When the operator 36 is properly positioned through the use of the stop collar 130, the fuel passage 90 is aligned with fuel passages 76 and 78 so that fuel may be supplied to the vehicle engine. Also, the finger 100 has now moved out of its contact spreading position so that the contacts 96 may become engaged. It is to be understood that one of the springs 94 is connected to the electrical switch 32 by a conductor 134 and to the coil (not shown) of the vehicle engine through a conductor 136. Thus, when the contacts 96 are in engagement, electrical current is supplied to the ignition system of the vehicle engine. Movement of the operator 36 rearwardly results in the movement of the detent 116 to its inoperative position of Figure 2 so that the hood control cable 16 may be tensioned to release the hood of the vehicle so that access to the interior of the engine compartment may be obtained.

Although the hood control cable 16 has been illustrated in vertical alignment with the various parts of the vehicle lock assembly, it is to be understood that if it is so desired, the hood control cable 16 may be disposed remote from the remainder of the vehicle lock assembly. This is permissible due to the provision of the cable 124 which may be extended as desired.

Inasmuch as all the major portions of the vehicle lock assembly are so constructed whereby they may be remotely mounted within the engine compartment and since the hood is provided with a suitable latch, it is readily apparent that a vehicle provided with the vehicle lock assembly may be securely locked against tampering. Thus, a vehicle may be run only when the key operated lock 22 is manipulated through a key, such as the key 28, or by breaking of the key operated lock 22. However, inasmuch as the housing 24 of the key operated lock 22 is relatively strong, tampering therewith is prevented.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A vehicle lock assembly comprising a fuel line shut-off valve having a fuel inlet and outlet, an ignition switch and a hood control cable latch, a single operator for simultaneously controlling said valve, switch and latch, a lock operatively connected to said operator for releasably locking said operator, said operator including a rod slidable through said valve and said switch, said rod having a fuel passage alignable with said fuel inlet and outlet and a switch engaging pin, and a pull cable connecting said rod to said latch.

2. A vehicle lock assembly comprising a lock structure, a fuel line shut-off valve having a fuel inlet and outlet, an ignition switch and a hood control cable latch, a single operator operatively connected with and controlled by said lock structure for simultaneously controlling said valve, switch and latch, said operator including a rod slidable through said valve and said switch, said rod having a fuel passage alignable with said fuel inlet and outlet and a switch engaging pin, and a pull cable connecting said rod to said latch, said valve and said switch being connected together as a unit, said latch being disposed remotely of said unit.

3. A lock assembly for an operator comprising a key lock, a lock shaft connected to said key lock for rotation therewith, said lock shaft being rotatably mounted in a housing, said operator being slidable through said housing, a control rod slidably mounted in said housing and connected to said lock shaft for operation thereby, said control rod selectively locking said operator in said housing, said operator being provided with a recess, a detent seated in said recess to lock said operator, said detent being retained in place by said control rod, said control rod having a recess therein for receiving said detent to permit releasing of said operator, and a further spring urged detent releasably engageable with said operator to retain said operator in operative position.

4. In a vehicle having an instrument panel, a fire wall, a hood and a hood control cable extending through the fire wall and having a handle at its rear end, a vehicle lock assembly comprising a key operated lock adapted to be mounted on the instrument panel between the instrument panel and the fire wall, an operator in the form of a slidable rod carried by and controlled by the key operated lock, said slidable rod extending through said fire wall into a fuel valve and ignition switch housing mounted on the front of said firewall, means on said slidable rod portion within said fuel valve and ignition switch housing for operating said fuel valve and said ignition switch, and a latch for the hood control cable positioned forwardly of the fire wall and connected to the front end of said slidable rod.

5. The structure as set forth in claim 4, wherein said sliding rod includes a handle portion disposed between said key operated lock and said fire wall, rearward movement of said handle and sliding rod, when released by said key operated lock, serving to open said fuel valve, close said ignition switch and free said latch from said hood control cable.

6. The structure as set forth in claim 4 wherein said key operated lock and the rear end of said slidable rod are enclosed in a lock housing, said key operated lock having a rotatable control shaft connected to a control rod in said lock housing, said control rod selectively locking said slidable operator rod in said lock housing.

7. The structure as set forth in claim 4, wherein said means on said slidable rod include a fuel passage extending transversely through said rod, said fuel passage being selectively alignable with inlet and outlet passages in said fuel valve upon movement of said slidable rod.

8. The structure as set forth in claim 4, wherein said ignition switch comprises a pair of contact springs biased to closed position and said means on said slidable rod includes an insulated pin movable between said contact springs to close said switch upon movement of said slidable rod.

9. The structure as set forth in claim 4, wherein said latch for said hood control cable includes a housing enclosing an intermediate portion of said cable, a block slidably mounted on said cable housing and connected to the cable and a spring urged detent engageable with a recess in the block, said detent being connected to the forward end of said slidable rod by a pull cable.

References Cited in the file of this patent
UNITED STATES PATENTS

| | | |
|---|---|---|
| 1,102,830 | Walker | July 7, 1914 |
| 1,421,684 | Geraghty | July 4, 1922 |
| 1,746,432 | Leiva | Feb. 11, 1930 |
| 2,084,045 | Olsen | June 15, 1937 |
| 2,637,789 | Critchfield et al. | May 5, 1953 |

FOREIGN PATENTS

| | | |
|---|---|---|
| 602,451 | France | Dec. 23, 1925 |